United States Patent [19]

Williams

[11] Patent Number: 4,700,763
[45] Date of Patent: Oct. 20, 1987

[54] REMOTELY CONTROLLED AIRCRAFT TIRE INFLATION/DEFLATION VALVE

[75] Inventor: Donald E. Williams, Dayton, Ohio

[73] Assignee: The United States of America as represented by the Secretary of the Air Force, Washington, D.C.

[21] Appl. No.: 784,128

[22] Filed: Oct. 4, 1985

Related U.S. Application Data

[63] Continuation of Ser. No. 594,615, Mar. 29, 1984, abandoned.

[51] Int. Cl.$^4$ .................. B60C 23/10; B60C 29/00
[52] U.S. Cl. .................... 152/417; 137/522; 137/523; 141/114; 152/427; 244/103 R; 251/129.22; 301/5 VH; 301/126; 301/132; 335/255
[58] Field of Search ............... 152/416, 417, 418, 427; 180/905; 137/223, 522, 523; 251/129, 140, 129.01, 129.22; 141/114, 38, 46; 188/322.21; 267/64, 28; 244/103 R; 335/2.55; 301/5 VH, 124 R, 125, 126, 131, 132

[56] References Cited

U.S. PATENT DOCUMENTS

| | | | |
|---|---|---|---|
| 1,859,879 | 5/1932 | Longacre | 251/129.22 |
| 1,944,113 | 1/1934 | Shenton | 251/129.01 |
| 2,299,879 | 10/1942 | Court | 230/39 |
| 2,419,117 | 4/1947 | Chalfant et al. | 251/129.01 |
| 2,463,522 | 3/1949 | Davidson | 152/416 |
| 2,685,906 | 8/1954 | Williams | 152/417 |
| 2,747,640 | 5/1956 | Kress | 152/417 |
| 3,362,452 | 1/1968 | Harnish | 152/416 |
| 3,805,912 | 4/1974 | Mattson et al. | 180/118 |
| 4,154,279 | 5/1979 | Tsuruta | 152/416 |

Primary Examiner—Donald E. Czaja
Assistant Examiner—Thomas Bokan
Attorney, Agent, or Firm—Bobby D. Scearce; Donald J. Singer

[57] ABSTRACT

A novel inflation/deflation system for the pneumatic tires of a vehicle, and particularly of an aircraft, is described, which comprises a housing on the vehicle, such as in the form of a fixed axle housing, on which the tire and wheel are mounted for rotation, and defining a cavity coaxial with the axis of rotation of the wheel for housing the valve and related components; a manifold within the housing defines a manifold chamber containing and supporting an axially movable poppet valve; a remotely controllable solenoid is mounted within the axle housing coaxially with the manifold and poppet valve, the plunger of the solenoid being operatively connected to the poppet valve for axial movement of the poppet valve between open and closed positions in response to operation of the solenoid, whereby pressurized air may be selectively supplied from a pneumatic source to the manifold and to the tire through pneumatic lines connected thereto.

2 Claims, 2 Drawing Figures

REMOTELY CONTROLLED AIRCRAFT TIRE INFLATION/DEFLATION VALVE

RIGHTS OF THE GOVERNMENT

The invention described herein may be manufactured and used by or for the Government of the United States for all governmental purposes without the payment of any royalty.

This is a continuation of application Ser. No. 06/594,615, filed Mar. 29, 1984 now abandoned.

BACKGROUND OF THE INVENTION

The present invention relates generally to devices for controlling pressure within pneumatic tires, and more particularly to a remotely controllable valve system through which a vehicle tire may be inflated or deflated.

In the operation of wheeled vehicles carried by pneumatic tires, it is frequently desirable to control the inflation pressure within the tires for optimum operational efficiency of the tires and the wheeled vehicle under various operating and road conditions for extended tread life of the tires, anti-skid precautions, blow-out prevention, and other safety and economy reasons. Such measures are especially important in the operation of large aircraft. For example, optimum tire performance may be obtained using relatively high inflation pressure for take-off, and relatively low inflation pressure for landing. These desirable inflation levels may be variable depending upon weather and runway surface conditions. Further, and especially as applied to the large transport and tanker aircraft, large changes in the gross weight of the aircraft may occur during its mission, such as by personnel or equipment deployment or by inflight transfer of aircraft fuel. Suitable control of the inflation pressure of the tires of the aircraft provides proper reduced pressure consistent with the landing weight of the aircraft upon termination of the mission. When landing on unimproved airfields, control of the inflation pressure affords maximum flotation capability to the aircraft; footprint size is optimized for improved ground control and braking capability on any runway surface. Tread life may be extended by as much as 100% by judicious control of the tire inflation pressure.

The present invention provides a novel remotely controllable pneumatic inflation/deflation valve system especially suited for use aboard an aircraft, and which is characterized by the foregoing desirable attributes. The valve of the present invention provides selective inflation or deflation of the aircraft tires from aboard the aircraft during flight or during ground taxi, in order to provide momentaneous optimum tire pressure consistent with existing flight or taxi conditions.

It is therefore a principal object of the present invention to provide an improved inflation/deflation system for the pneumatic tires of a wheeled vehicle.

It is a further object to provide a remotely controllable pneumatic tire inflation/deflation system for an aircraft.

It is yet a further object to provide a remotely controllable pneumatic tire inflation/deflation system for an aircraft which is compact and can be accommodated within the axle of the aircraft.

These and other objects of the present invention will become apparent as the detailed description of certain representative embodiments thereof proceeds.

SUMMARY OF THE INVENTION

In accordance with the foregoing principles and objects of the present invention, a novel inflation/deflation system for the pneumatic tires of a vehicle, and particularly of an aircraft, is described, which comprises a housing on the vehicle, such as in the form of a fixed axle housing, on which the tire and wheel are mounted for rotation, and defining a cavity coaxial with the axis of rotation of the wheel for housing the valve and related components; a manifold within the housing defines a manifold chamber containing and supporting an axially movable poppet valve; a remotely controllable solenoid is mounted within the axle housing coaxially with the manifold and poppet valve, the plunger of the solenoid being operatively connected to the poppet valve for axial movement of the poppet valve between open and closed positions in response to operation of the solenoid, whereby pneumatic pressure may be selectively supplied from a pneumatic source to the manifold and to the tire through pneumatic lines connected thereto.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
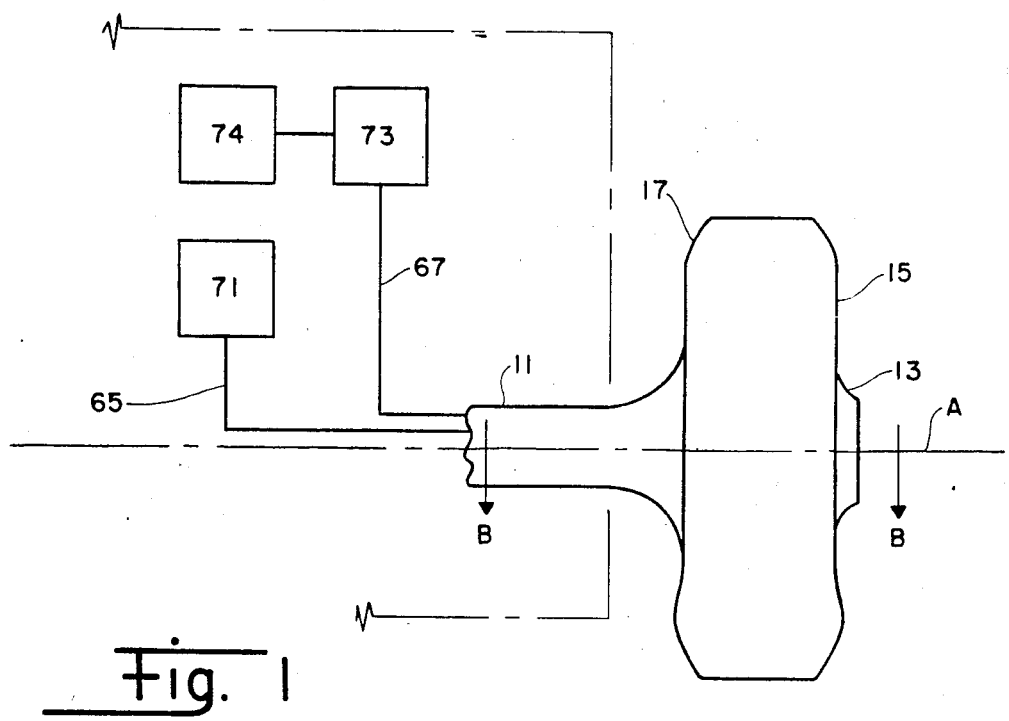
FIG. 1 shows a schematic of portions of a wheel and axle of a vehicle illustrating placement of the inflation/deflation valve system of the present invention and of the associated controls and power and pneumatic supply systems.
Figure 2:
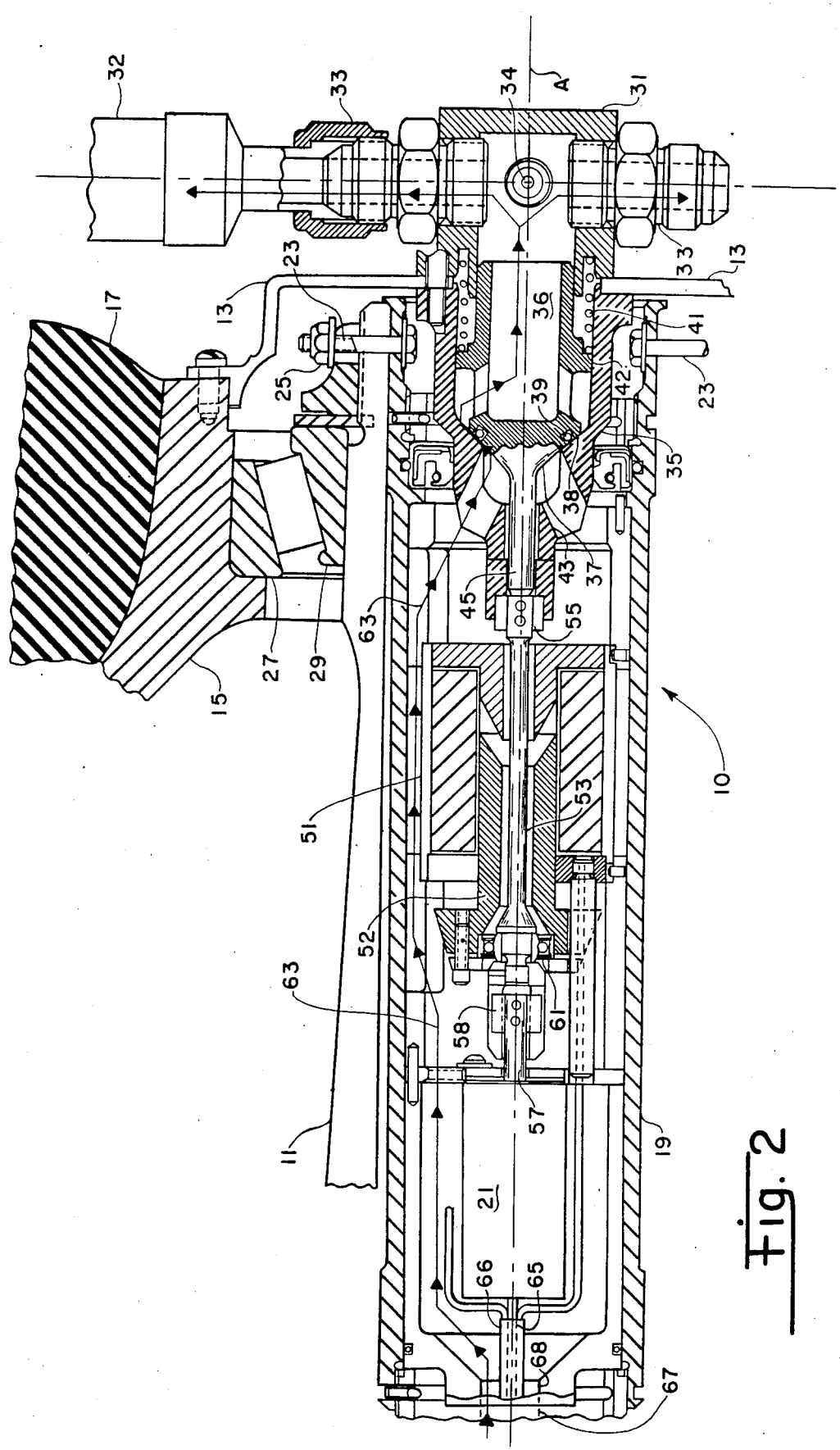
FIG. 2 is an axial sectional view of the axle and supported wheel and tire of FIG. 1 as taken along lines B—B thereof illustrating the component parts of a representative embodiment of the valve system of the present invention.

FIG. 1 of the drawings shows a schematic of a vehicle tire and axle and associated controls and pneumatic and power supplies for the operation of the present invention. FIG. 2 shows an axial sectional view of the axle, wheel and tire of FIG. 1, and including a representative configuration of the inflation/deflation valve system 10 of the present invention. Specifically, FIG. 2 illustrates a hollow aircraft axle housing and typical placement of the present invention therein.

Referring first to FIG. 2, valve system 10 of the present invention may be housed within the cavity defined by a housing attached to the aircraft, such as a fixed aircraft axle housing 11 which supports hub 13, wheel 15, and tire 17 for rotation about axis A. It is preferable, however to include a housing or can 19 of suitable size and configuration for containing and supporting the component parts of valve assembly 10 within axle housing 11. Valve assembly 10 is, in the embodiment shown in the drawings, configured to be placed within axle 11 just inboard of the wheel hub 13 at a location which normally may be occupied by an anti-skid detector. In order to accommodate the valve system 10 of the present invention, it was found to be highly preferable to locate the anti-skid detector 21 of the aircraft deeper within axle 11, substantially as shown in FIG. 2. Anti-skid detector 21 may therefore be of substantially conventional structure and operation, and may be housed within can 19 axially adjacent valve assembly 10. As described in detail hereinafter, anti-skid detector 21 may be driven in a manner similar to that for the more customary location, immediately axially adjacent the wheel hub 13.

Can 19, comprising the housing for valve system 10 and (optionally) anti-skid detector 21, may be secured to the axle by suitable conventional means such as axle bolts 23 and lock nuts 25 secured within appropriately located registering holes in axle 11 and can 19, substantially as shown. Wheel and rim 15 supporting tire 17 is otherwise configured conventionally for rotation about axis A on axle 11 on a bearing assembly which may comprise a bearing cup 27 supported on a bearing cone 29. The inboard end of can 19 is suitably configured to define the required pass-throughs for electrical leads and pneumatic conduits for operation of anti-skid detector 21 and valve system 10 as hereinafter described.

In a preferred, representative embodiment, valve assembly 10 of the present invention comprises an outer manifold housing section 31, located outside hub 13 and mounted for rotation with hub 13 about axis A. One or more flexible air lines 32 connected to manifold 31 at standard pneumatic fittings 33 provide a suitable means for supplying pneumatic (air) pressure to tire 17. Wheel 15 and tire 17 may otherwise have suitable pneumatic fittings for connection thereto of pneumatic lines 32. A standard valve stem 34 may be provided on outer manifold 31, substantially as shown, in order to provide access for tire 17 inflation using conventional means.

An inner manifold housing 35 is mounted inboard of the hub 13 for rotation therewith about axis A, and defines a manifold chamber 36 in communication with outer manifold 31 through an opening defined through hub 13. Inner manifold housing 35 supports a poppet valve 37, which is mounted for axial movement along axis A within chamber 36. Inner manifold housing 35 defines an annular shoulder 38 which contacts the conical shaped surface of poppet valve 37, substantially as shown in FIG. 2, to provide a non-rotating air seal against leakage of inflation pressure from tire 17. The pneumatic inflation pressure within tire 17 may provide the force necessary in order to sealably hold poppet valve 37 closed against annular shoulder 38 of inner manifold housing 35. A positive seal for poppet valve 37 may be assisted by providing an annular gasket seal 39 at the interface of poppet valve 37 and annular shoulder 38, and a closing spring 41 acting on an annular shoulder 42 on poppet valve 27 as suggested in FIG. 2. Poppet valve 37 is, therefore, held normally closed by the tire 17 inflation pressure, and the resiliency of spring 41. One or more air inlet ports 43 are defined in the inboard end of inner manifold housing 35, and communicate with chamber 36 around the periphery of annular shoulder 38 when poppet valve 37 is open, and through which inflation air may be impressed upon tire 17. An axial hole in the inboard end of housing 35 is provided for receiving shaft 45 operatively connected to poppet valve 37 for opening and closing thereof by axial movement of shaft 45.

An electrically operated solenoid 51 is disposed inboard of poppet valve 37 and coaxially therewith. The solenoid plunger 52 of solenoid 51 has an axial hole for receiving a shaft 53, which may be integral with or operatively connected to shaft 45, such as through a standard connector 55 as shown, for coaxial movement with shaft 45. Plunger 52 is held normally open by spring 41 and the tire 17 inflation pressure acting on poppet valve 37. The inboard end of shaft 53 is operatively connected, such as by standard connector 58, to the shaft 57 that drives anti-skid detector 21 disposed in the innermost end of can 19. Plunger 52 is operatively connected to axial shaft 53 in any suitable manner, preferably as shown in FIG. 2 as thrust bearing assembly 61 so that shafts 57, 53, 45 are rotatable with poppet valve 37, inner manifold housing 35 and hub 13. Both solenoid 51 and antiskid detector 21 are mounted within can 19 in suitable configuration to define an annular space or passageway therearound for passage of air through can 19 from its inboard end to poppet valve 37, as suggested by the dotted line and arrows indicating a representative inflation air flow pattern 63 through can 19.

In the operation of inflation/deflation valve system 10, tire 17 may be inflated by imposing air pressure on can 19 through the fittings provided on the inboard end thereof. Spring 41 may be provided with suitable resiliency such that poppet valve 37 is forced open by the imposed air pressure and tire 17 is filled to a pressure consistent with the resilient force of the spring 41. Popper valve 37 may also be opened by activating solenoid 51, and tire 17 thereby inflated to any desirable air pressure notwithstanding the resiliency of spring 41. When solenoid 51 is actuated, thrust bearing 61 moves shaft 53 (and shaft 45 connected thereto) outwardly against poppet valve 37. When poppet valve 37 is thereby forced open, inflation air may enter through ports 43 in inner manifold housing 35, and may flow around annular seal 39, through hub 13, and into outer manifold 31 for distribution to tire 17 through pneumatic lines 32.

Referring now to FIG. 1 in conjunction with FIG. 2, electrical control lines 65 and pneumatic conduits 67 may be connected to the inboard end of can 19 and axle housing 11, substantially as shown, through appropriate electrical connectors 66 and pneumatic fittings 68 in order to power, control, and monitor the operation of poppet valve 37, solenoid 51, and anti-skid detector 21. Lines 65 and conduits 67 may be connected to suitable power source and controller 71 and pneumatic source 73 and pneumatic controller 74 for remote control of valve 10, as by a pilot or flight engineer, from the flight deck of the aircraft.

The present invention, as hereinabove described, provides a novel remotely controllable tire inflation/deflation valve system. It is understood that certain modifications to the invention may be made, as might occur to one with skill in the field of this invention, within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. A valve system for remotely controlling, by selective inflation and deflation, the air pressure within a pneumatic tire of a wheel mounted for rotation on an axle of a vehicle, comprising:
   a. housing means on said vehicle defining within said axle a substantially cylindrically shaped cavity adjacent said wheel and coaxial therewith;
   b. an inner manifold housing within said cavity and mounted to said wheel for rotation therewith, said inner manifold housing having an inlet and an outlet;
   c. means defining a pneumatic conduit operatively interconnecting said outlet of said inner manifold housing with said tire for conducting pressurized air between said inner manifold housing and said tire;

d. a poppet valve within said inner manifold housing and mounted for rotation therewith and axially moveable therein between open and closed positions, and spring means resiliently interconnecting said poppet valve and said inner manifold housing for urging said poppet valve axially against said inner manifold housing inlet to said closed position;

e. means on said poppet valve and near said inner manifold inlet defining a non-rotating seal between said poppet valve and said inner manifold housing in said closed position for selectively sealing said inlet of said inner manifold housing whereby pressurized air is selectively conducted between said manifold inlet and said tire in response to axial movement of said poppet valve;

f. a solenoid mounted within said cavity axially adjacent said poppet valve and coaxial with said inner manifold housing and said poppet valve, said solenoid including a plunger in axially alignment with the inner manifold housing and axially moveable between retracted and extended positions, said plunger has an axial hole receiving a shaft which is operatively connected to another shaft operatively connected to said poppet valve for axial and rotational movement therewith, said retracted position and said extended position corresponding respectively to said closed position and said open position of said poppet valve;

g. control means, remote of said tire, for selectively moving said plunger said retracted position and said extended position and thereby selectively closing and opening said poppet valve to selectively inflate and deflate said tire;

h. a source of pressurized air; and i. conduit means interconnecting said source and said inner manifold housing inlet for selectively conducting pressurized air to said inner manifold housing.

2. The valve system as recited in claim 1 further comprising an outer manifold housing external of said axle and mounted to said wheel for rotation therewith, said outer manifold housing including an inlet and an outlet, said outer manifold housing inlet operatively connected to the outlet of said inner manifold housing, and wherein said means defining a pneumatic conduit interconnects said outer manifold housing outlet and said tire for conducting pressurized air between said inner manifold housing and said tire.

* * * * *

UNITED STATES PATENT AND TRADEMARK OFFICE
CERTIFICATE OF CORRECTION

PATENT NO. : 4,700,763

DATED : October 20, 1987

INVENTOR(S) : Donald E. Williams

It is certified that error appears in the above-identified patent and that said Letters Patent is hereby corrected as shown below:

```
Column 3, line 48, "27" should be ---37---.
Column 6, line 6, in claim 1, subparagraph g, after "plunger"
should appear ---between---.
```

Signed and Sealed this

Tenth Day of May, 1988

Attest:

DONALD J. QUIGG

Attesting Officer

Commissioner of Patents and Trademarks